Dec. 4, 1951  M. L. TAYLOR  2,577,048
VARIABLE VENT PARACHUTE
Filed Sept 9, 1949  2 SHEETS—SHEET 1

INVENTOR.
MYRON L. TAYLOR
BY *Willard D. Eakin*
ATTORNEY

INVENTOR.
MYRON L. TAYLOR
BY Willard D. Eakin
ATTORNEY

Patented Dec. 4, 1951

2,577,048

UNITED STATES PATENT OFFICE 2,577,048

VARIABLE VENT PARACHUTE

Myron L. Taylor, Hudson, Ohio

Application September 9, 1949, Serial No. 114,700

4 Claims. (Cl. 244—145)

This invention relates to parachutes having a resiliently restricted vent opening adapted to be automatically enlarged for large flow capacity in response to high decelerating force, as in the case of a parachute launched from an airplane at high speed or launched in a condition of overload, to prevent excessive shock or strain on the parachute or its load, and then automatically to become smaller as the decelerating force becomes less, to lessen the escape of air through the vent as the velocity of the parachute decreases and thus to maintain a high resistance for a given velocity and provide a desirably low ultimate velocity after having permitted a high initial or early velocity without excessive shock or strain.

My chief objects are to provide, for varying the vent's flow capacity in accordance with the deceleration force, restricting means that will have the advantage of maintaining a small flow capacity of the vent for a sufficient time for quick filling out of the chute, followed, in case of high decelerating force, by an enlargement of the vent such as to prevent excessive shock or strain on the parachute or its load at the time of highest decelerating force, and then a decreasing flow capacity of the vent for bringing the chute to its final velocity; the advantage of comprising resilient means that will not lose resilience or become frangible at very low temperature, as in the case of a rubber composition held in a stretched condition, and thus especially susceptible to freezing, for too long a time; the advantage of being adapted for easy and safe manipulation in the matter of being packed and released; the advantage of quick and easy replacement of broken or damaged resilient elements; and the advantages of strength, lightness and durability.

Figure 1:
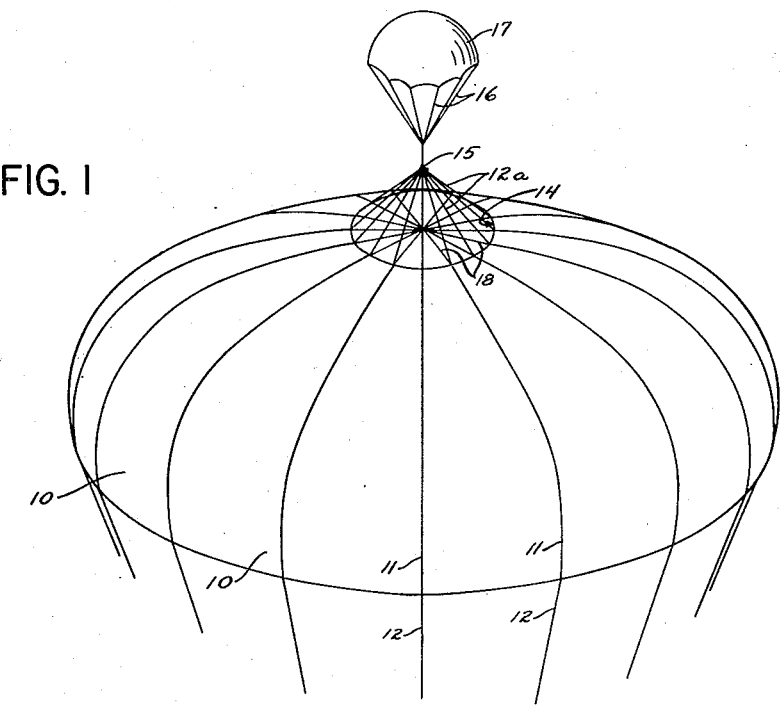
Fig. 1 is a perspective view of a parachute embodying my invention in its preferred form.
Figure 2:
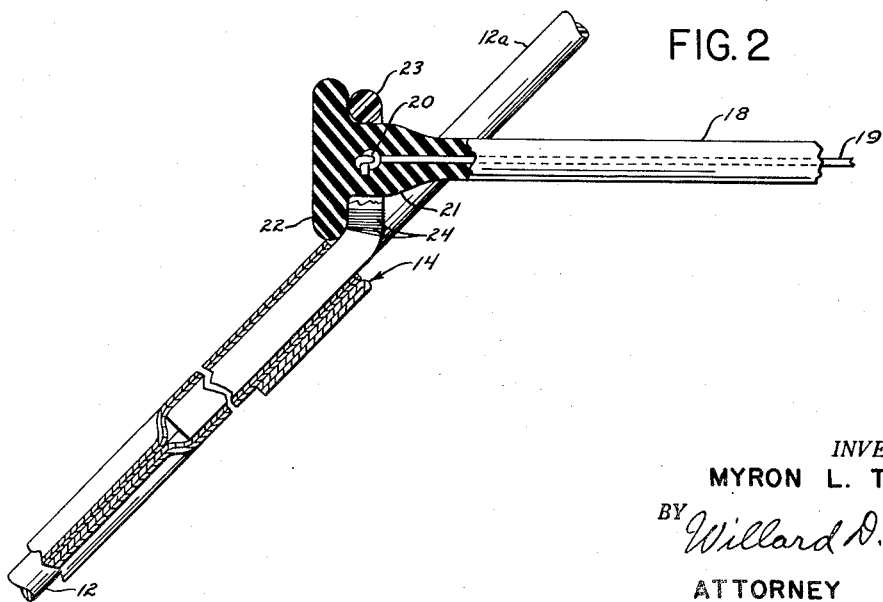
Fig. 2 is a fragmentary plan view of the central portion of the same, showing resilient means for permitting enlargement, and by recoil effecting reduction, of the flow capacity of the vent opening.
Figure 3:
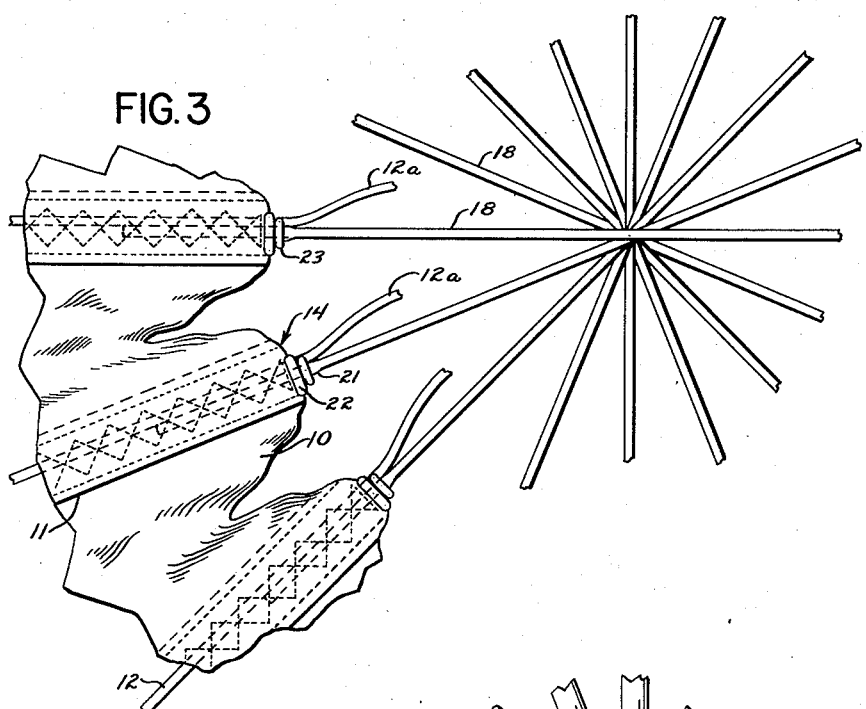
Fig. 3 is a fragmentary side view, partly in section, of one of the resilient elements and frangible means requiring to be broken before the beginning of resilient elongation of the resilient element.

The parachute illustrated in Figs. 1, 2 and 3 comprises a canopy formed of gores 10, 10 joined to one another in the usual hem type double seams 11, 11 and having shroud lines 12, 12 extending lengthwise in the seams and each locally secured at 13, as by sewing, to a contractile collar 14.

From their points of anchorage at 13, 13 to the collar the shroud lines continue inwardly, with slackness when the vent opening is not distended, and at a meeting point 15 (Fig. 1) these extensions, 12a, 12a, are joined to each other and to the shroud lines 16, 16 of a pilot chute 17. Thus the set of shroud line extensions provide substantially inextensible cross-tie members for limiting, on occasion, the enlargement of the parachute vent opening.

The resilient means for controlling the size of the vent opening comprises a set of elastic tie members 18, 18 extending across the opening and having their ends anchored to the collar substantially at the positions of the anchorages of the shroud lines to the collar. Each elastic tie member 18, of an elastic and preferably non-freezing natural or synthetic rubber composition, has within it a central, longitudinally disposed, substantially inextensible but breakable element 19, such as a nylon strand. The strand 19 is anchored at each of its ends by being there tied in a knot 20 which is interlockingly embedded in the rubber of a relatively large-diameter fillet or neck portion 21 of the element 18. The portion 21 is adjacent to and merges into a terminal anchoring-head portion 22 of the elastic element 18.

In the preferred embodiment here shown the anchorage of each end of each member 18 is effected by sewing to the collar 14 the legs of an inextensible loop 23 of suitable material, passing the head 22 of the member 18 through the loop and then tightening the loop 23 about the neck 21 of the member 18 by binding the two legs of the loop together with a wrapping 24 of nylon cord or the like.

This construction provides for quick and easy replacement of a broken or damaged tie 18 with a new one and provides a strong and durable anchorage. The large-diameter neck portion 21, engaged by the loop 23, and tapering to the smaller-diameter portion of the tie, prevents excessive local strains in the rubber and provides good anchorage, in a substantially non-stretching part of the tie, for the knotted or otherwise enlarged end of the inextensible but breakable member 19.

The construction as described is such that upon the launching of the parachute the vent opening will be held to minimum flow capacity by the inextensible elements 19, with fullness of the collar 14 as shown in Fig. 2, at least until the parachute has completely filled out and until the pressure of air within the parachute has become great enough, if it ever does, to break the elements 19. Thereupon the elastic elements 18, freed for elastic action, permit enlargement of the flow capacity of the opening as the maximum decelerating force develops, to prevent excessive shock or strain, and then, by their recoil, reduce the opening's flow capacity in response to decrease of decelerating force. By so reducing the size of the opening they maintain a higher decelerating force, at any given velocity, than would exist if they were not effective to reduce the flow capacity of the opening.

The strength of the inextensible but breakable elements 19 of the ties can be such that they will break and thus provide variability of the vent only in the extreme cases of high decelerating force incident to launching of the parachute at an extremely high speed or in an extremely overloaded condition.

Figure 4:
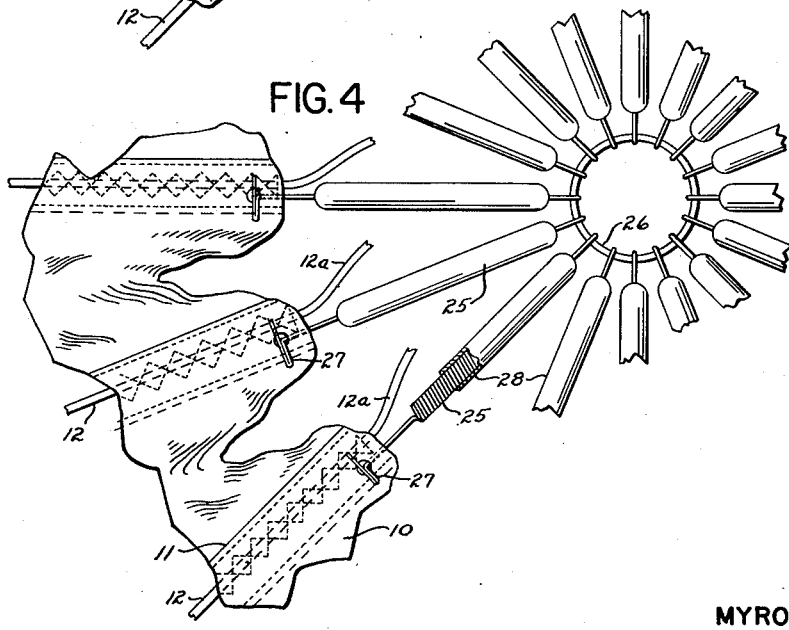
Fig. 4 is a fragmentary plan view of the central portion of a parachute having resilient means of an alternative type for controlling the size of the vent opening.

The embodiment shown in Fig. 4 corresponds substantially to that shown in Figs. 1 to 3 except that the resilient means comprises a circumferentially spaced set of helical springs 25, 25 anchored at their inner ends to a small central floating ring 26 and radiating from it like the spokes of a wheel and having their outer ends anchored to the collar 14, as by having their terminal wires extending through respective grommets in the collar and looped or otherwise formed with heads on the outer side of the grommet, as at 27, 27.

In this embodiment the substantially inextensible but breakable elements consist of fabric or other covers 28, 28 fitting the sides and over the ends of the coiled portions of the springs. These covers, in addition to their functioning as inextensible but breakable elements, also serve the function of preventing pinching or catching of fabric of the canopy between coils of the springs. Also the anchoring of the radiating elements to the small central ring 26 makes unnecessary the stacking of them at a crossing position and avoids the entanglement dangers of having tie members of which each extends all of the way across the opening without anchorage to one another at their crossing position.

Other modifications are possible within the scope of the invention as defined in the appended claims, in which, for succinctness, the collar 14 is considered as being a part of the canopy.

I claim:

1. A parachute comprising a canopy having a margin defining a vent opening, resilient means operatively associated with said margin for permitting enlargement, and by recoil effecting reduction, of the flow capacity of the opening, and breakable means for preventing deformation of the resilient means, for enlargement of the flow capacity, throughout a substantial but limited range of distending force sustained by said margin, said resilient means comprising a reach of material having substantially the resilient deformability of vulcanized soft-rubber and said breakable means comprising a reach of substantially inextensible but breakable material embedded in the resilient material.

2. A parachute comprising a canopy having a margin defining a vent opening, resilient means operatively associated with said margin for permitting enlargement, and by recoil effecting reduction, of the flow capacity of the opening, and breakable means for preventing deformation of the resilient means, for enlargement of the flow capacity, throughout a substantial but limited range of distending force sustained by said margin, said resilient means having substantially the resilient deformability of vulcanized soft-rubber and said breakable means comprising a reach of substantially inextensible but breakable material embedded in the resilient material, and having an enlargement at an end thereof for anchorage in the resilient material.

3. A parachute comprising a canopy having a margin defining a vent opening, resilient means operatively associated with said margin for permitting enlargement, and by recoil effecting reduction, of the flow capacity of the opening, and breakable means for preventing deformation of the resilient means, for enlargement of the flow capacity, throughout a substantial but limited range of distending force sustained by said margin, said resilient means comprising an extensible reach of spring metal and a substantially inextensible but breakable cover on said reach of spring metal.

4. A parachute comprising a canopy having a margin defining a vent opening and resilient means operatively associated with said margin for permitting enlargement, and by recoil effecting reduction, of the flow capacity of the opening, said resilient means comprising a reach of material having substantially the resilient deformability of vulcanized soft-rubber and formed at an end thereof with an anchorage head, the assembly including means on the canopy margin for interlocking with said head for anchorage of said resilient means to said margin.

MYRON L. TAYLOR.

REFERENCES CITED

The following references are of record in the file of this patent:

UNITED STATES PATENTS

| Number | Name | Date |
|---|---|---|
| 1,340,259 | Taylor | May 18, 1920 |
| 2,350,646 | Smith | June 6, 1944 |
| 2,474,124 | Schultz | June 21, 1949 |

FOREIGN PATENTS

| Number | Country | Date |
|---|---|---|
| 361,431 | Italy | July 21, 1938 |